(12) United States Patent
Liao

(10) Patent No.: US 9,798,594 B2
(45) Date of Patent: *Oct. 24, 2017

(54) SHARED MEMORY EIGENSOLVER

(71) Applicant: Silicon Graphics International Corp., Milpitas, CA (US)

(72) Inventor: Cheng Liao, Pleasanton, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/408,092

(22) Filed: Jan. 17, 2017

(65) Prior Publication Data

US 2017/0228267 A1 Aug. 10, 2017

Related U.S. Application Data

(63) Continuation of application No. 14/537,839, filed on Nov. 10, 2014, now Pat. No. 9,547,882.

(60) Provisional application No. 61/901,731, filed on Nov. 8, 2013.

(51) Int. Cl.
*G06F 17/16* (2006.01)
*G06F 9/54* (2006.01)
*G06F 9/50* (2006.01)
*G06F 9/48* (2006.01)

(52) U.S. Cl.
CPC ............ *G06F 9/544* (2013.01); *G06F 9/4887* (2013.01); *G06F 9/5016* (2013.01); *G06F 9/5066* (2013.01); *G06F 17/16* (2013.01); *G06F 2212/2542* (2013.01)

(58) Field of Classification Search
CPC ........ G06F 9/50; G06F 9/5061–9/5066; G06F 9/544; G06F 12/02–12/0207; G06F 17/16; G06F 2212/2542; G06N 99/005; G06T 1/60
See application file for complete search history.

(56) References Cited

U.S. PATENT DOCUMENTS

| 9,262,799 | B2 | 2/2016 | Liao | |
|---|---|---|---|---|
| 9,547,882 | B2 | 1/2017 | Liao | |
| 2003/0187898 | A1* | 10/2003 | Nakanishi | ............... G06F 17/16 708/520 |
| 2006/0077091 | A1 | 4/2006 | Wu et al. | |
| 2010/0185716 | A1 | 7/2010 | Nakamura et al. | |
| 2012/0139926 | A1 | 6/2012 | Clohset et al. | |

(Continued)

FOREIGN PATENT DOCUMENTS

WO WO 2015/070185 5/2015

OTHER PUBLICATIONS

PCT Application No. PCT/US2014/064688 International Search Report and Written Opinion dated Apr. 8, 2015.

(Continued)

*Primary Examiner* — Matthew Sandifer

(57) ABSTRACT

Disclosed herein is a shared memory systems that use a combination of SBR and MRRR techniques to calculate eigenpairs for dense matrices having very large numbers of rows and columns. The disclosed system allows for the use of a highly scalable tridiagonal eigensolver. The disclosed system likewise allows for allocating a different number of threads to each of the different computational stages of the eigensolver.

20 Claims, 11 Drawing Sheets

(56) References Cited

U.S. PATENT DOCUMENTS

2015/0134714 A1 5/2015 Liao
2016/0299874 A1 10/2016 Liao

OTHER PUBLICATIONS

Ballard et al., "Communication Avoiding Symmetric Band Reduction," Principles and Practice of Parallel Programming, 10 pages (Feb. 25, 2012).
Bischof et al., "The SBR Toolbox-Software for Successive Band Reduction," ACM Transactions on Mathematical Software, 16 pages (Apr. 1996).
Haidar et al., "A novel hybrid CPU-GPU generalized eigensolver for electronic structure calculations based on fine-grained memory aware tasks", International Journal of High Performance Computing Applications, Publication [online]. Aug. 30, 2013 [retrieved Jan. 15, 2015]. Retrieved from the Internet: <URL:http://hpc.sagepub.com/content/early/2013/08/29/1094342013502097.full.pdf>; pp. 1-14.
Haidar et al., "Parallel Reduction to Condensed Forms for Symmetric Eigenvalue Problems using Aggregated Fine-Grained and Memory-Aware Kernels," International Conference for High Performance Computing, Networking, Storage and Analysis, 11 pages (Nov. 14, 2011).
Ltaief et al., "Solving the Generalized Symmetric Eigenvalue Problem using Tile Algorithms on Multicore Architectures," Advances in Parallel Computing, vol. 22, pp. 397-404 (2012).
Luszczek et al., "Two-Stage Tridiagonal Reduction for Dense Symmetric Matrices using Tile Algorithms on Multicore Architectures," International Parallel & Distributed Processing Symposium, 14 pages (May 16, 2011).
Schmidt et al., "Guide to the pbdDMAT Package", Remote Data Analysis and Visualization Center, University of Tennessee, Version 2.0; Publication [online]. 2012 [retrieved Jan. 15, 2015]. Retrieved from the Internet <URL: http://cran.r-project.org/web/packages/pbdDMAT/vignettes/pbdDMAT-guide.pdf>; pp. 1-19.
Petschow et al., "MR3-SMP: A Symmetric Tridiagonal Eigensolver for Multi-core Architectures," Parallel Computing, vol. 37, pp. 795-805 (Dec. 2011).
Ribeiro et al., "Memory Access Characterization of OpenMP Workloads on a Multi-core NUMA Machine," Institut National de Recherche en Informatique et en Automatique, 29 pages (Jun. 2010).
Univ. of Tennessee "Plasma Readme," icl.cs.utk.edu/projectsfiles/plasma/html/README.html, 7 pages (Jul. 4, 2013).
PCT Application No. PCT/US2014/064888 International Search Report and Written Opinion dated Feb. 4, 2015.

\* cited by examiner

Algorithm 1 Tile Band TRD Algorithm with Householder Reflectors.

```
 1: for step = 1, 2 to NT−1 do
 2:     DGEQRT(A_{step+1,step})
 3:     {Left Updates}
 4:     DLARFB(A_{step+1,step}, A_{step+1,step+1})
 5:     for i = step+1 to NT do
 6:         {Right Updates}
 7:         DLARFB(A_{step+1,step}, A_{i,step+1})
 8:     end for
 9:     for k = step+2 to NT do
10:         DTSQRT(A_{step+1,step}, A_{k,step})
11:         {Left Updates}
12:         for j = step+1 to k do
13:             if (j == step+1) then
14:                 DSSRFB(A_{step+1,j}, A_{k,j}, Atmp1)
15:             else if (j == k) then
16:                 DSSRFBLR(Atmp1, A_{k,j}, Atmp2)
17:             else
18:                 DSSRFBLRT(A_{j,step+1}, A_{k,j})
19:             end if
20:         end for
21:         {Right Updates}
22:         for m = step+1 to NT do
23:             if (m == step+1) then
24:                 DSSRFB(Atmp2, Atmp3, A_{k,m})
25:             else if (m == k) then
26:                 DSSRFBRL(Atmp3, A_{k,m})
27:             else if (m > k) then
28:                 DSSRFBRLT(A_{m,step+1}, A_{k,m})
29:             end if
30:         end for
31:     end for
32: end for
```

Algorithm 2 Standard Bulge Chasing Algorithm of $b$ extra diagonals.

1: for $k = 1, 2$ to $N-2$ do
2:    {Column annihilation}
3:    DGEQR2($B_{k+1:k+min(b,n-k),k}$)
4:    {Left and right updates on a diagonal block}
5:    DSYRF($B_{k+1:k+min(b,n-k),\,k+1:k+min(b,n-k)}$)
6:    {Chasing the bulge}
7:    for $i = k+1$ to $N$ with $i = +b$ do
8:      if $i+b == n$ then
9:        {Right update for clean-up}
10:       DLARFX($B_{min(i+b,n),\,i:min(i+b,n)-1}$)
11:      end if
12:      if $min(i+b,n) < (n-1) \,\|\, min(i+2*b,n) < (n-1)$ then
13:        {Column annihilation within the sweep}
14:        DGEQR3($B_{min(i+b,n):min(i+2*b,n)-1,\,i:min(i+b,n)-1}$)
15:        {Left and right updates on a diagonal block}
16:        DSYRF($B_{min(i+b,n):min(i+2*b,n)-1,\,min(i+b,n):min(i+2*b,n)-1}$)
17:      end if
18:    end for
19: end for

FIG. 6

SHARED MEMORY EIGENSOLVER

CROSS-REFERENCE TO RELATED APPLICATIONS

The present application is a continuation and claims the priority benefit of U.S. patent application Ser. No. 14/537,839 filed Nov. 10, 2014, now issuing as U.S. Pat. No. 9,547,882, which claims the priority benefit of U.S. provisional application No. 61/901,731 filed Nov. 8, 2013, the disclosures of which are incorporated herein by reference.

BACKGROUND OF THE INVENTION

Field of the Invention

The present invention generally relates to a non-uniform memory access (NUMA) computer system. More specifically, the present invention relates to computing eigenvalues and eigenvectors of a very large matrix in a NUMA computer system.

Description of the Related Art

Some data modeling applications use matrices that describe transformations of physical parameters. For example, a cosmological model of a galaxy might use a matrix to describe the motion of stars in space. A finite element model of a material may use a matrix to model stresses in a material at a number of different locations. These matrices transform initial property vectors of the model into final property vectors by standard matrix multiplication For any transformation by matrix multiplication, there may be certain vectors for which the transformation merely acts to lengthen or shorten the vector. These vectors are called "eigenvectors" of the transformation. Eigenvectors provide "preferred directions"; vectors parallel to eigenvectors are not rotated by the transformation. The corresponding scaling factor of the lengthening or shortening for a given direction is called the "eigenvalue" for a the eigenvector.

Different eigenvectors may have different corresponding eigenvalues, and eigenvectors with an eigenvalue of 1 are not lengthened or shortened by the transformation; for these vectors, the transformation preserves length. Eigenvectors and eigenvalues provide a useful mathematical tool to analyze matrix transformations. It is, therefore, desirable to be able to compute eigenvectors and eigenvalues (collectively, "eigenpairs") for any given matrix.

Several techniques are known to calculate eigenpairs of a matrix. One family of "eigensolver" techniques first reduces the matrix to a tridiagonal form. A tridiagonal form is a form in which the main diagonal of the matrix and the diagonals just above and below may contain non-zero numbers; all other entries are zero. Such an eigensolver computes the eigenpairs of the tridiagonal matrix then converts the computed eigenvectors back to the original reference system.

In order to improve scalability, the ACM TOMS 807 algorithm, or successive band reduction ("SBR"), is often employed for the tridiagonal reduction phase. In SBR, the initial, densely-populated matrix is reduced to a multiple band intermediate form having many non-zero diagonals in a first stage. The matrix is later reduced from the multiple band form to the tridiagonal (three band) form in the second stage.

After calculating the eigenpairs in a third stage, the eigenvector back-transformation also requires two stages: from the tridiagonal to the multiple band reference system in stage four and to the original dense reference system in stage five. The multistage SBR approach allows highly scalable BLAS-3 computing kernels to be used, but the two stage eigenvector back-transformation introduces additional floating point operations that influence scalability.

LAPACK (Linear Algebra Package) is a standard software library for numerical linear algebra. LAPACK provides routines for solving systems of linear equations and linear least squares, eigenvalue problems, and singular value decomposition. LAPACK also includes routines to implement associated matrix factorizations. The ScaLAPACK (or Scalable LAPACK) library includes a subset of LAPACK routines redesigned for distributed memory MIMD parallel computers. ScaLAPACK allows for interprocessor communication and assumes matrices are laid out in a two-dimensional block cyclic decomposition.

LAPACK and ScaLAPACK both have underlying deficiencies. For example, neither LAPACK or ScaLAPACK employ SBR calculations. Nor is LAPACK designed for scalability. And the ScaLAPACK library communicates using the aforementioned message passing, which is slower than communication using shared memory for tridiagonal eigensolvers.

The Parallel Linear Algebra Software for Multicore Architectures ("PLASMA") is a mathematical library for performing conversion of a dense symmetric array to and from tridiagonal form on shared memory systems with multi-core processors. An example of such systems are shown in FIG. 1-3 as described below. PLASMA includes a tiled storage of the data arrays and a DAG (directed acyclic graph) scheduling of the computational subtasks. PLASMA improves over older LAPACK and ScaLAPACK libraries in terms of memory usage pressure, process synchronization requirements, task granularity, and load balance. PLASMA results in increased performance and scalability for sufficiently large problems.

PLASMA nevertheless suffers from a number of shortcomings, especially with respect to solving very large problems. For example, PLASMA is limited to 32-bit architectures. Because matrix entries are addressed using 32-bit signed integers, the largest matrix on which PLASMA may operate has a dimension N limited to the square root of the largest 32-bit signed integer (N=sqrt($2^{31}$)=46340). This value of N is too low to operate on matrices that have hundreds of thousands or millions of rows and columns, as is required by some computations.

Because PLASMA is limited to smaller matrices, PLASMA does not use a tridiagonal eigenpair solver that effectively scales for larger matrices. While algorithms such as the multiple relatively robust representations ("MRRR") algorithm exist to achieve such scaling, PLASMA is not designed to use them. PLASMA also operates on a fixed pool of threads. This is disadvantageous because different subtasks that occur in the five stages of the eigensolver may occur in parallel and have different computational complexities. A static thread allocation for all five stages is inefficient.

There is a need in the art for shared memory systems that use a combination of SBR and MRRR techniques to calculate eigenpairs for dense matrices having very large numbers of rows and columns. There is a further need for shared memory systems that are not merely "scaled up" versions of PLASMA that allow for increased scalability but that allow for the use of a highly scalable tridiagonal eigensolver. There is a still further need for a shared memory system that is capable of allocating a different number of threads to each of the different computational stages of the eigensolver.

SUMMARY OF THE CLAIMED INVENTION

In a first embodiment of the present invention, a computerized method for computing eigenvectors and eigenvalues in a high performance computing (HPC) system having a plurality of nodes is claimed. Each node includes one or more processing cores for executing program threads, the nodes having non-uniform memory access. The method involves reducing a square input matrix into a band matrix, reducing the band matrix to a tridiagonal matrix, computing eigenvectors and eigenvalues of the tridiagonal matrix using multiple relatively robust representations, transforming the computed eigenvectors of the tridiagonal matrix into eigenvectors of the band matrix, transforming the eigenvectors of the band matrix into eigenvectors of the input matrix such that various processes are each dynamically scheduled for execution by a number of program threads as a function of the relative runtimes of the processes.

BRIEF DESCRIPTION OF THE DRAWINGS

FIG. 5 is an algorithm listing of the first step illustrated in FIG. 4.

FIG. 6 is an algorithm listing of the second step shown in FIG. 4.

DETAILED DESCRIPTION

Figure 1:
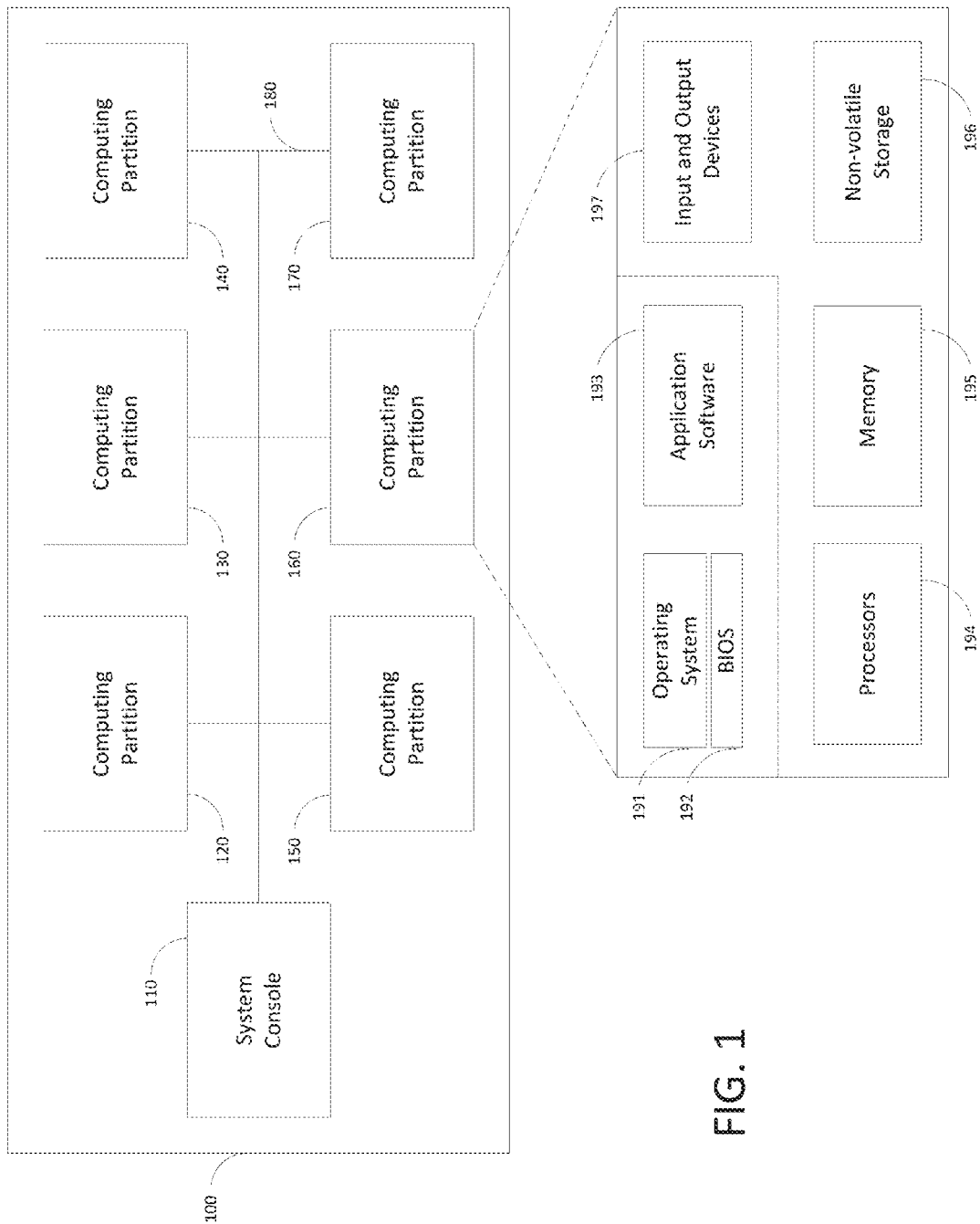
FIG. 1 illustrates a High Performance Computing (HPC) system.

FIG. 1 illustrates a High Performance Computing (HPC) system 100. A high-performance computing system or HPC system is generally understood to be a computing system having multiple modular computing resources. These resources are communicatively coupled to one another using hardware interconnects. Through such a communicative coupling, processors may directly access remote data using a common memory address space.

The HPC system 100 of FIG. 1 includes a number of logical computing partitions 120-170. Partitions 120-170 provide computational resources. System console 110 manages the aforementioned partitions 120-170. A "computing partition" or "partition" in an HPC system (like that illustrated in FIG. 1) is generally understood to be an administrative allocation of computational resources that runs a single operating system instance and has a common memory address space. Partitions 120-170 may communicate with system console 110 using a logical communication network 180.

A system user such as a scientist or engineer who desires to perform a calculation may request computational resources from a system operator. The system operator uses the system console 110 to allocate and manage those resources, which may occur automatically. The HPC system 100 may have any number of administratively assigned computing partitions. Some HPC systems may only have one partition that encompasses all of the available computing resources.

Each computing partition, such as partition 160, may be logically viewed as if it were a single computing device akin to a desktop computer. Partition 160 may execute software including an instance of an operating system ("OS") 191 that uses a basic input/output system ("BIOS") 192. Partition 160 may further execute application software 193 for one or more system users. As is also shown in FIG. 1, a computing partition has various allocations of hardware including one or more processors 194, volatile memory 195, non-volatile storage 196, and input and output ("I/O") devices 197. Examples of I/O devices 197 include network cards, video display devices, and keyboards.

In HPC systems like that shown in FIG. 1, each computing partition typically has more processing power and memory than a commercial desktop computer. The OS software may include a Windows®-based operating system from Microsoft Corporation or an open source solution, such as a Linux operating system. Although the BIOS may be provided as firmware by a hardware manufacturer such as Intel Corporation, the BIOS of an HPC system is typically customized according to the needs of the system designer to support specific high-performance computing needs.

System console 110 may act as an interface between the computing capabilities of the computing partitions 120-170 and the system operator or other computing systems. System console 110 of FIG. 1 issues commands to the HPC system hardware and software on behalf of the system operator and that permit the likes of booting hardware, dividing system computing resources into computing partitions, initializing partitions, monitoring the health of each partition and any hardware or software errors generated therein. Further operations under the command and control of system console 110 may include distributing operating systems and application software to various partitions, causing the operating systems and software to execute, backing up the state of the partition or software therein, shutting down application software, and shutting down a computing partition or the entirety of HPC system 100.

Figure 2:
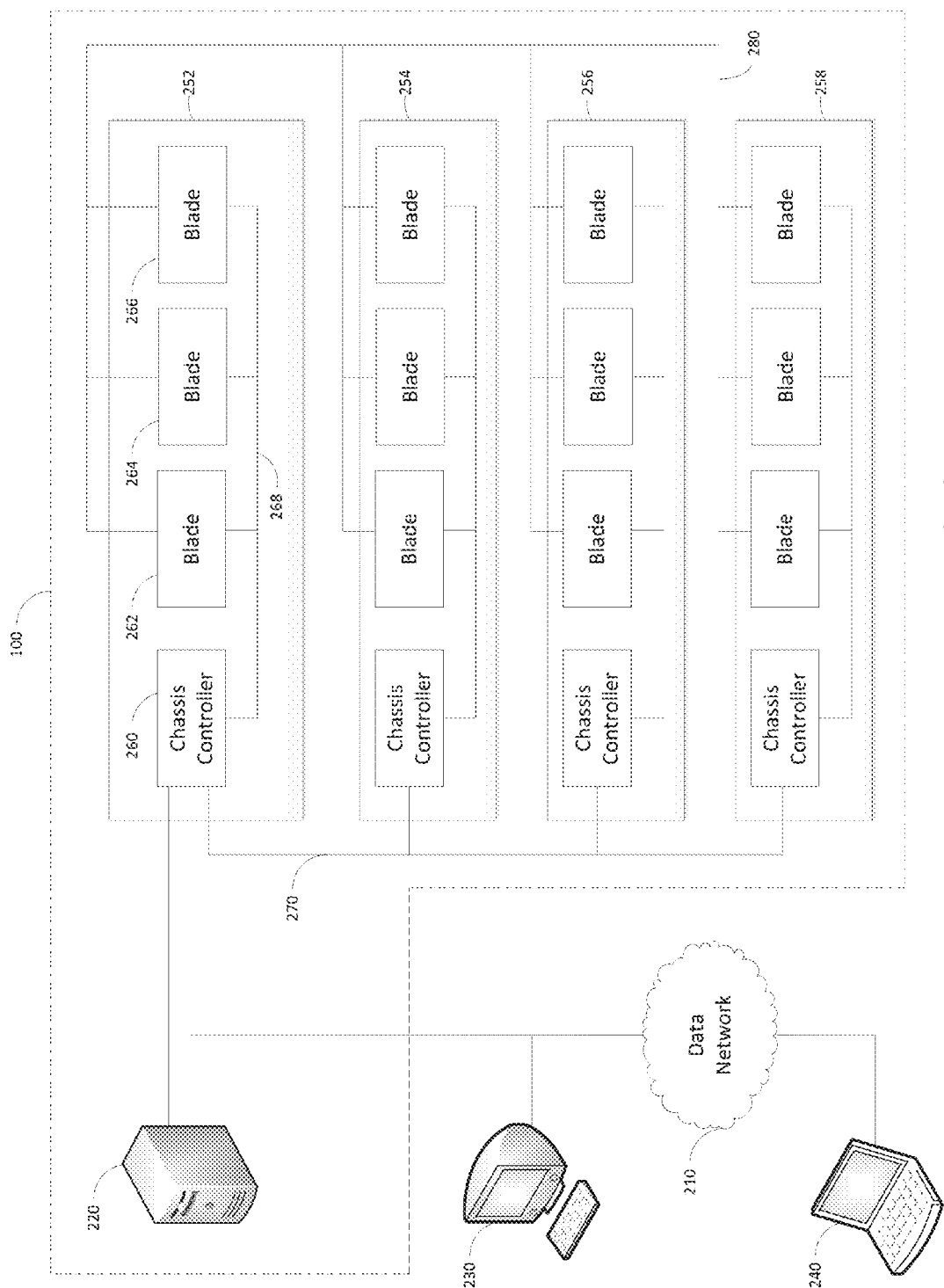
FIG. 2 illustrates a physical view of the HPC system of FIG. 1.

FIG. 2 illustrates a physical view of the HPC system 100 of FIG. 1. The hardware of HPC system 100 of FIG. 1 is surrounded by the dashed line in FIG. 22. The HPC system 100 is connected to an enterprise data network 210 to facilitate user access.

The HPC system 100 illustrated in FIG. 2 includes a system management node ("SMN") 220 that performs the functions of the system console 110. The management node 220 may be implemented as a desktop computer, a server computer, or other computing device that may be provided by either the enterprise or the HPC system designer. Management node 220 of FIG. 2 includes the software necessary to control the HPC system 100 (i.e., system console software).

The HPC system 100 of FIG. 2 is accessible using the data network 210. Network 210 may include any data network known in the art, such as an enterprise local area network ("LAN"), a virtual private network ("VPN"), the Internet, or a combination of these networks. Any of these networks may permit a number of users to remotely and/or simultaneously access the HPC system resources. For example, the management node 220 may be accessed by an enterprise computer 230 by way of remote login using tools known in the art such as Windows® Remote Desktop Services or the Unix secure shell.

If the enterprise is so inclined, access to the HPC system 100 may be provided to a remote computer 240. The remote computer 240 may access the HPC system by way of a login to the management node 220 as described above. Access may also occur using a gateway or proxy system as is known to persons od ordinary skill in the art.

The hardware computing resources of the HPC system 100 (e.g., the processors, memory, non-volatile storage, and I/O devices shown in FIG. 1) are collectively provided by one or more "blade chassis" such as blade chassis 252-258 as illustrated in FIG. 2. A blade chassis is an electronic chassis that houses, powers, and provides high-speed data communications between multiple stackable, modular electronic circuit boards called "blades." Each blade includes enough computing hardware to act as a standalone computing server. The modular design of a blade chassis permits the blades to be connected to power and data lines with a minimum of cabling and vertical space. Chassis 252-258 of FIG. 2 are managed and allocated into computing partitions.

Each blade chassis (e.g., blade chassis 252) has a chassis management controller 260 for managing system functions in the blade chassis 252. Chassis management controller 260 may in some instances be referred to as a "chassis controller" or "CMC." Chassis controller 260 likewise controls the system functions of the individual blades (e.g., 262-266) in a given chassis.

Each blade (e.g., blade 262) contributes its hardware computing resources to the collective total resources of the HPC system 100. The system management node 220 manages the hardware computing resources of the entire HPC system 100 using the chassis controllers, such as chassis controller 260. Each chassis controller, in turn, manages the resources for the blades in its particular blade chassis. The chassis controller 260 is physically and electrically coupled to the blades 262-266 inside the blade chassis 252 by local management bus 268. The hardware in the other blade chassis 254-258 is similarly configured.

Chassis controllers communicate with each other using a management connection 270. The management connection 270 may be a high-speed LAN running an Ethernet communication protocol or other data bus. By contrast, the blades communicate with each other using computing connection 280. The computing connection 280 of FIG. 2 may be a high-bandwidth, low-latency system interconnect like NumaLink, which is a system interconnect developed by Silicon Graphics International Corp. for use in its distributed shared memory computer systems.

Chassis controller 260 provides system hardware management functions to the rest of the HPC system 100. Chassis controller 260 may receive a system boot command from the SMN 220 and respond by issuing boot commands to each of the blades 262-266 using local management bus 268. Chassis controller 260 may similarly receive hardware error data from one or more of the blades 262-266 and store this information for later analysis with error data stored by the other chassis controllers.

SMN 220 or an enterprise computer 230 may, in some embodiments of FIG. 2, be provided access to a single, master chassis controller 260. A master chassis controller 260 may process system management commands to control the HPC system 100 and forward these commands to other chassis controllers. In some instances, SMN 220 may only be directly coupled to the management connection 270. SMN 220 may individually issue commands to each chassis controller. Other variations of design are within the scope of the presently disclosed invention but readily configurable by those persons having ordinary skill in the art.

The blade chassis 252, the computing hardware of its blades 262-266, and the local management bus 268 may be configured as known in the art. The chassis controller 260, however, may be implemented using hardware, firmware, or software provided by the HPC system designer. Each blade provides the HPC system 100 with some quantity of processors, volatile memory, non-volatile storage, and I/O devices that are known in the art of standalone computer servers. Each blade also has hardware, firmware, and/or software to allow these computing resources to be grouped together and collectively treated as computing partitions.

While FIG. 2 illustrates an HPC system 100 having four chassis and three blades in each chassis, it should be appreciated that the scope of the invention is not limited to this particular illustrative embodiment. An HPC system may have dozens of chassis and hundreds of blades. HPC systems are often desired because they provide very large quantities of tightly-coupled computing resources. In this regard, any number of variations of the configuration of an HPC system like that shown in FIG. 2 are possible and that would otherwise remain within the scope of the present invention.

Figure 3:
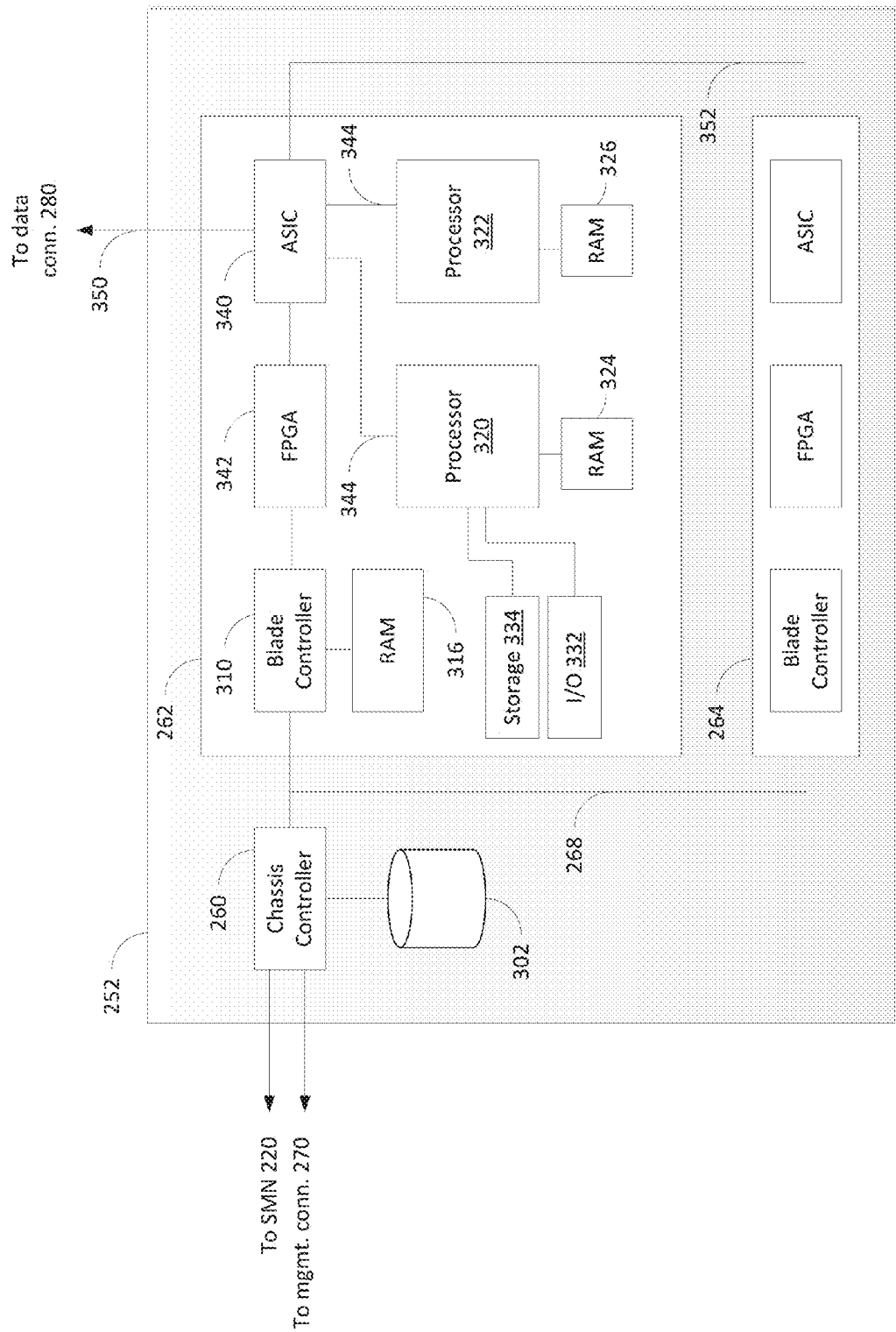
FIG. 3 illustrates a blade chassis of the HPC system of FIGS. 1 and 2.

FIG. 3 illustrates a blade chassis (252) of the HPC system 100 of FIGS. 1 and 2. Parts and components not necessary to understanding the immediate description that follows have been omitted from FIG. 3 in order to simplify said discussion. The chassis controller 260 is illustrated with connections to system management node 220 and management connection 270. Chassis controller 260 may be provided with a chassis data store 302 for storing chassis management data. The chassis data store 302 may be volatile random access memory ("RAM") whereby data would be accessible by the SMN 220 so long as power is applied to the blade chassis 252 even if one or more of the computing partitions has failed or an individual blade has malfunctioned. Chassis data store 302 may also be non-volatile storage such as a hard disk drive ("HDD") or a solid state drive ("SSD"). Data in the chassis data store 302 in such an embodiment would remain accessible after the HPC system has been powered down and rebooted.

Blade 262 includes a blade management controller 310 (also called a "blade controller" or "BMC") that executes system management functions at a blade level. The operations of BMC 310 at the blade level are analogous to the functions performed by a chassis controller at the chassis level. The blade controller 310 may be implemented as custom hardware designed by the HPC system designer to permit communication with the chassis controller 260. Blade controller 310 may have its own RAM 316 to carry out management functions. The chassis controller 260 in FIG. 3 communicates with the blade controller 310 of each blade using the local management bus 268.

The blade 262 illustrated in FIG. 3 also includes one or more processors 320 and 322 that are connected to RAM 324 and 326, respectively. Blade 262 may be alternately configured so that multiple processors may access a common set of RAM on a single bus. Processors 320 and 322 may include any number of central processing units ("CPUs") or cores. Processors 320 and 322 in blade 262 of FIG. 3 are connected to other components such as a data bus that allows for communication with I/O devices 332 and a data bus that communicates with non-volatile storage 334. Other buses commonly found in standalone computing systems may similarly be implemented.

Processors 320 and 322 may be Intel® Core™ processors manufactured by Intel Corporation. The I/O bus may be a PCI or PCI Express ("PCIe") bus. The storage bus may be a SATA, SCSI, or Fibre Channel bus. Other bus standards, processor types, and processor manufacturers may be used in accordance with the illustrative embodiment shown in FIG. 3.

Each blade in FIG. 3 (e.g., the blades 262 and 264) include an application-specific integrated circuit 340, which may be referred to as an "ASIC," "hub chip," or "hub ASIC" that controls its functionality or portions thereof. To logically connect processors 320 and 322, RAM 324 and 326, and other devices such as I/O device 332 and storage 334 to form a managed, multi-processor, coherently-shared distributed-memory HPC system, the processors 320 and 322 are electrically connected to the hub ASIC 340. The hub ASIC 340 of FIG. 3 provides an interface between the HPC system management functions generated by the SMN 220, chassis controller 260, and blade controller 310, and the computing resources of the blade 262.

As illustrated in FIG. 3, hub ASIC 340 connects with the blade controller 310 by way of a field-programmable gate array ("FPGA") 342 or similar programmable device for passing signals between integrated circuits. Signals are generated on output pins of the blade controller 310 in response to commands issued by the chassis controller 260. These signals are translated by the FPGA 342 into commands for certain input pins of the hub ASIC 340 and vice versa. For example, a "power on" signal received by the blade controller 310 from the chassis controller 260 requires, among other things, providing a "power on" voltage to a certain pin on the hub ASIC 340, which is facilitated by the FPGA 342.

The field-programmable nature of the FPGA 342 permits the interface between the blade controller 310 and ASIC 340 to be reprogrammable after manufacturing. Thus, the blade controller 310 and ASIC 340 may be designed to have certain generic functions while the FPGA 342 may be used advantageously to program the use of those functions in an application-specific way. The communications interface between the blade controller 310 and ASIC 340 may also be updated if a hardware design error is discovered in either module thereby permitting a quick system repair without requiring new hardware to be fabricated.

Hub ASIC 340 may also be connected to processors 320 and 322 by way of a high-speed processor interconnect 344. Processors 320 and 322 may be connected using the Intel® QuickPath Interconnect ("QPI"). Hub ASIC 340 may include a module for communicating with processors 320 and 322 using QPI. Other processor interconnect configurations may be implemented in the context of FIG. 3.

The hub chip 340 in each blade also provides connections to other blades for high-bandwidth, low-latency data communications. Hub chip 340 may include a link 350 to computing connection 280 that connects different blade chassis. Link 350 may be implemented using networking cables. The hub ASIC 340 of FIG. 3 may also include connections to other blades in the same blade chassis 252. The hub ASIC 340 of blade 262 in FIG. 3 connects to the hub ASIC 340 of blade 264 by way of a chassis computing connection 352. The chassis computing connection 352 may be implemented as a data bus on a backplane of the blade chassis 252 rather than using networking cables thereby allowing for the high speed data communication between blades that is typically required for high-performance computing tasks. Data communication on both the inter-chassis computing connection 280 and the intra-chassis computing connection 352 may be implemented using the NumaLink protocol or a similar protocol.

System management commands may propagate from the SMN 220 through the management connection 270 to the blade chassis and their chassis controllers. Management commands may subsequently be communicated to blades and blade controllers. SNM 200 originated commands may finally be conveyed to the hub ASICS that implement those commands using system computing hardware.

In an exemplary embodiments of the present invention, the HPC system 100 may be powered when a system operator issues a "power on" command from the SMN 220. The SMN 220 propagates this command to each of the blade chassis 252-258 by way of their respective chassis controllers such as chassis controller 260 in blade chassis 252. Each chassis controller, in turn, issues a "power on" command to each of the respective blades in its blade chassis by way of their respective blade controllers such as blade controller 310 of blade 262. Blade controller 310 issues a "power on" command to its corresponding hub chip 340 using the FPGA 342, which provides a signal on one of the pins of the hub chip 340 there by allowing for initialization. Other commands may similarly propagate.

Once the HPC system is powered on, its computing resources may be divided into computing partitions. The quantity of computing resources that are allocated to each computing partition is an administrative decision. For example, an enterprise may have a number of projects to complete and each project is projected to require a certain amount of computing resources. Different projects may require different proportions of processing power, memory, and I/O device usage. Different blades may have different quantities of installed resources. The HPC system administrator or an executable administration application may take these considerations into account when partitioning the computing resources of the HPC system 100. Partitioning computing resources may be accomplished by programming the RAM 316 of each blade. For example, the SMN 220 may issue appropriate blade programming commands after reading a system configuration file.

The collective hardware computing resources of the HPC system 100 may be divided into computing partitions according to any administrative need and subsequently created configuration file. A single computing partition may include the computing resources of some or all of the blades of one blade chassis 252, all of the blades of multiple blade chassis 252 and 254, some of the blades of one blade chassis 252, all of the blades of blade chassis 254, or even the entirety of the computing resources of the HPC system 100. Hardware computing resources may be statically partitioned, in which case a reboot of the entire HPC system 100 will be required to reallocate hardware. Hardware computing resources may also be dynamically partitioned while the HPC system 100 is powered on. Unallocated resources may be assigned to a partition without necessarily interrupting the operation of other partitions.

Once the HPC system 100 has been appropriately partitioned, each partition may be considered to act as a stand-alone computing system. Thus, two or more partitions may be combined to form a logical computing group inside the HPC system 100. Such grouping may be necessary if a particular computational task is allocated more processors or memory than a single operating system can control. For example, if a single operating system can only control 64 processors, but a particular computational task requires the combined power of 256 processors, then four partitions may be allocated to the task in such a group. This grouping may be accomplished by installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. A single logical computing partition 160 may span several blades, however, or even several blade chassis. A processor 320 or 322 inside a blade may be referred to as a "computing node" or simply a "node" to emphasize its allocation to a particular partition. It should be understood that a physical blade may comprise more than one computing node if it has multiple processors and memory.

Booting a partition requires a number of modifications to be made to a blade chassis. In particular, the BIOS in each blade is modified to determine other hardware resources in the same computing partition and not just those in the same blade or blade chassis. After a boot command has been issued by the SMN 220, the hub ASIC 340 provides an appropriate signal to the processor 320 to begin the boot process using BIOS instructions. The BIOS instructions, in turn, obtain partition information from the hub ASIC 340 such as an identification (node) number in the partition, a node interconnection topology, a list of devices that are present in other nodes in the partition, and a master clock signal used by all nodes in the partition.

With this information, the processor 320 may then take whatever steps are required to initialize the blade 262. These steps include non-HPC-specific steps such as initializing I/O devices 332 and non-volatile storage 334. HPC-specific steps may also be initiazlied such as synchronizing a local hardware clock to a master clock signal, initializing HPC-specialized hardware in a given node, managing a memory directory that includes information about which other nodes in the partition have accessed its RAM, and preparing a partition-wide physical memory map.

Each physical BIOS will at this point in the configuration process have its own view of the partition. The computing resources in each node are then prepared for the OS to load. The BIOS reads the OS image and executes the same. The BIOS presents the OS with a view of the partition hardware as if it were all present in a single computing device, including that hardware scattered amongst multiple blade chassis and blades. The OS instance effectively spreads itself across some, or preferably all, of the blade chassis and blades that are assigned to a given partition. Different operating systems may be installed on the various partitions. If an OS image is not present immediately after partition, the OS image may be installed before the partition boots.

Once the OS executes, its partition may be operated as a single logical computing device. Software for carrying out desired computations may be installed to the various partitions by the HPC system operator or an application executing under the control thereof. Users may then log into the SMN 220 and obtain access to their respective partitions. Access may be controlled using volume mounting and directory permissions based on login credentials.

The system operator may monitor the health of each partition and take remedial steps when a hardware or software error is detected. The current state of long-running application programs may be saved either periodically or on the command of the system operator or application user to non-volatile storage to guard against losing work in the event of a system or application crash. The system operator or a system user may issue a command to shut down application software. When administratively required, the system operator or an administrative application may entirely shut down a computing partition, reallocate or deallocate computing resources in a partition, or power down the entire HPC system 100.

Figure 4:
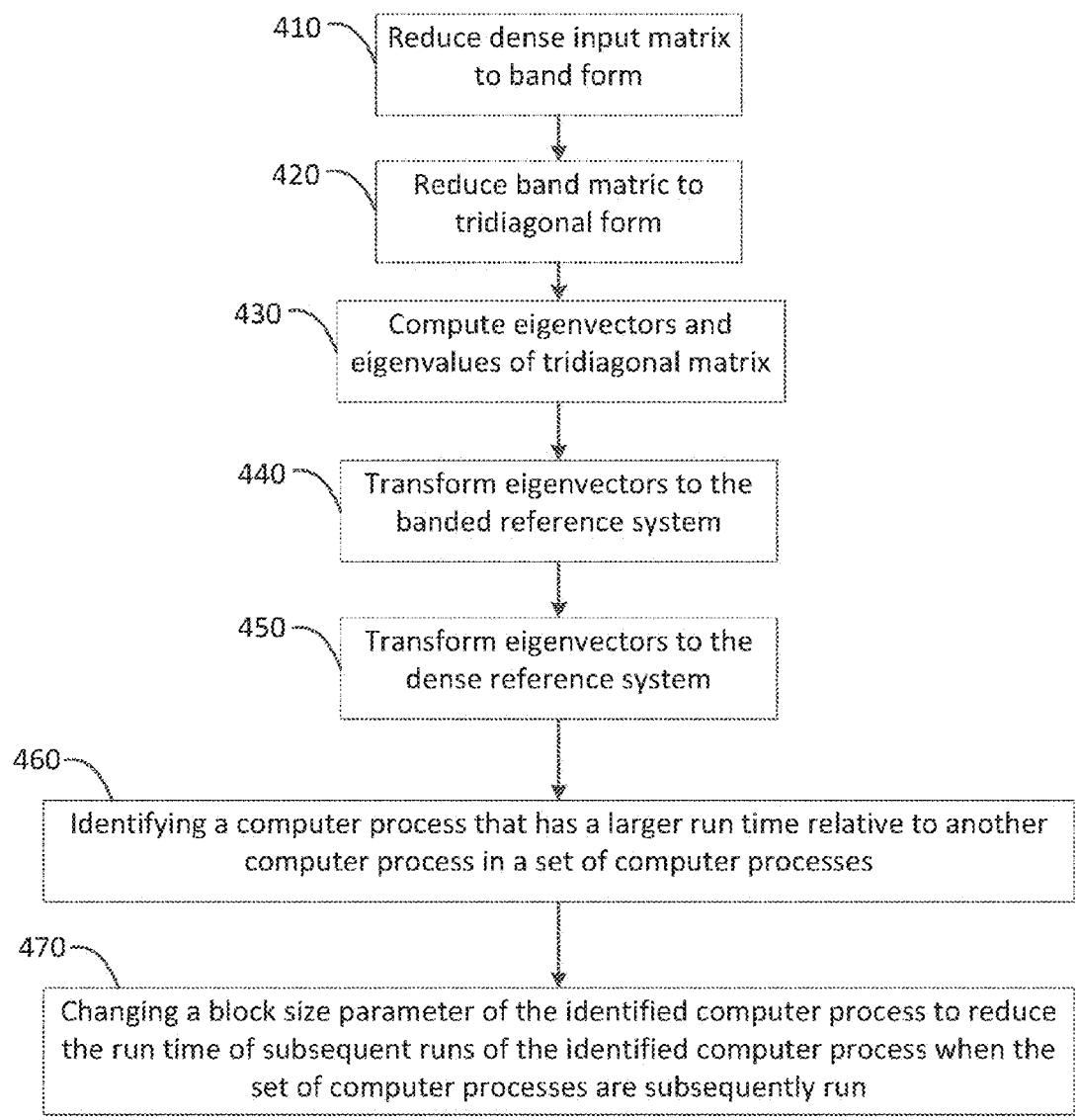
FIG. 4 illustrates five processes executed by a scalable eigensolver in an HPC system.

FIG. 4 illustrates five processes executed by a scalable eigensolver in an HPC system 100 like that of FIG. 1. The methodology of FIG. 4 begins with a square input matrix for which a user desires to calculate eigenvectors and eigenvalues (collectively, eigenpairs). The matrix is typically dense, rather than sparse. "Dense" matrices are those matrices whose entries are primarily non-zero. Dense matrices typically require more computational resources so these matrices are converted into band matrices and tridiagonal matrices as described herein.

In step 410 of FIG. 4, the dense input matrix is reduced to a band matrix. A "band matrix" is a sparse matrix whose non-zero entries are confined to diagonal bands that include the main diagonal and a number of diagonals on either side of (that is, above or below) the main diagonal. The total number of such bands is called the matrix "bandwidth." A purely diagonal matrix has a bandwidth of one; all non-zero entries are confined to a single band along the main diagonal. A tridiagonal matrix has a bandwidth of three. Step 410 as illustrated in FIG. 4, however, does not convert the input matrix to a tridiagonal matrix but rather converts the input matrix to a matrix having a bandwidth larger than three.

In this regard, reference is made to FIG. 5. FIG. 5 is an algorithm listing of the first step illustrated in FIG. 4 (410). The algorithm depicted in FIG. 5 is exemplary. Other algorithms may be utilized to achieve the same result as otherwise described with respect to step 410 of FIG. 4. Whatever algorithm might be chosen, it should be noted that step 410 cooperates with step 420 to reduce the dense input matrix to a tridiagonal matrix.

In a second step (420) as illustrated in FIG. 4, the band matrix is further reduced to a tridiagonal form. Such tridiagonal matrices lend themselves to various computational shortcuts that are not present in matrices having larger bandwidths. Such reduction may be achieved utilizing an algorithm like that disclosed in FIG. 6. FIG. 6 is an algorithm listing of the second process (420) shown in FIG. 4. The algorithm depicted in FIG. 6 is exemplary. Other algorithms may be utilized to achieve the same result as otherwise described with respect to step 420 of FIG. 6.

Steps 410 and 420, as noted above, cooperate to reduce the dense input matrix to a tridiagonal matrix. The algorithms depicted in FIGS. 5 and 6 for implementing steps 410 and 420, respectively, are described in LAPACK Working Note ("LAWN") 244 and entitled "Two-Stage Tridiagonal Reduction for Dense Symmetric Matrices using Tile Algorithms on Multicore Architectures," the disclosure of which is incorporated herein by reference.

Step 410 of FIG. 4 operates by performing successive band reduction ("SBR"). Step 420 of FIG. 4 operates by performing Householder reflections. A key difference between SBR and Householder reflections is that the SBR computation is mostly matrix-matrix multiplications while the Householder computation involves primarily matrix-vector multiplications. Matrix-matrix multiplications permit greater economies of scale when operating on an HPC system like that of FIG. 1 because they permit tighter data reuse.

To be specific in a matrix-matrix multiplication, each entry of the first matrix is multiplied by a collection of entries of the second matrix; each entry is used multiple times. This multiple use permits so-called block or tile matrix multiplication, which is efficient in an HPC system like that of FIG. 1. In a matrix-vector multiplication, however, each entry of the matrix is multiplied by only a single entry of the vector. Therefore, the matrix-matrix operations of SBR in process 410 are better suited to data localization in an HPC system 100 than the matrix-vector operations of Householder reflections in process 420.

There is a tradeoff between the amount of data localization and the overall computational efficiency that must be addressed. If the SBR block (or "tile") size is large, then the bandwidth of the sparse matrix resulting from step 410 will be high thereby causing step 420 to take a great and sometimes inefficient length of time. If the SBR tile size is smaller, then the data logistic requirements become expensive and an excessive amount of time may be spent distributing tiles and aggregating results of tile multiplications.

Figure 8:
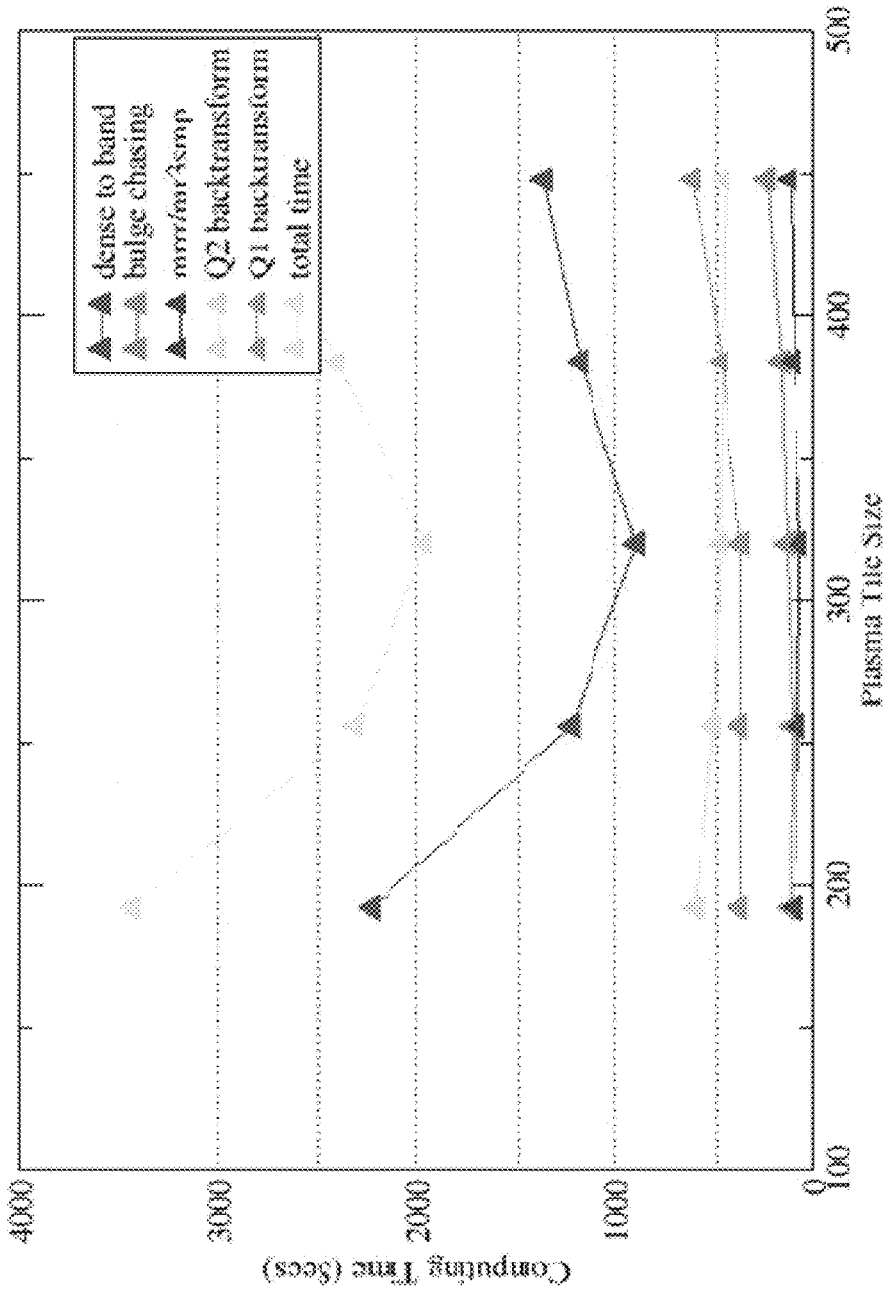
FIG. 8 illustrates the impact of variation of a tile size parameter with respect to compute time.

In one embodiment of the present invention it has been determined that an optimum tile size for certain Intel® processors is between about 128 and 512 entries on each side of a square tile and preferably close to 300 entries per side. Other embodiments may be optimized using different tile sizes. FIG. 8 illustrates the impact of variation of a tile size parameter with respect to compute time. In order to avoid shared memory network hotspots, all the memory pages are evenly distributed in a round-robin fashion over the computing nodes for achieving the best performance.

Step 430 requires computing eigenvectors and eigenvalues of the tridiagonal matrix obtained from step 420. While many methods are available, including power iteration, inverse iteration, the bisection method, and divide-and-conquer, one embodiment uses the multiple relatively robust representations (MRRR) method, which is implemented in MR3SMP and scales on large numbers of processors.

Step 440 and 450 may be implemented using an application of the Householder reflectors from steps 410 and 420 to the eigenvectors of the tridiagonal matrix to obtain the eigenvectors of the original matrix. Step 440 transforms the computed eigenvectors of the tridiagonal matrix into eigenvectors of the band matrix using data obtained during step 420. Step 450 transforms the eigenvectors of the band matrix into eigenvectors of the input matrix using data obtained during step 410.

The floating point intensive work in the eigensolver occurs in steps 410, 440, and 450. These steps have floating operation counts of $(4/3)*N^3$, $2*N^3$ and $(4/3)*N^3$, respectively, where N is the dimension of the matrix. Step 420 has $O(N^2)$ floating point operation count, so it can be left out of the eigensolver scalability considerations. Also, the floating point operation count of step 430 is $O(N^2)$ instead of $O(N^3)$ such that the MRRR implementation details may be omitted from the considerations for the overall eigensolver scalability. While the computation scales as $O(N^3)$, linear improvements can be made to the runtime by adjusting various parameters.

The scalability and performance of the three floating point intensive processes at steps 410, 440, and 450 are largely influenced by the number of computing threads (NTHDS), the PLASMA tile size (NB), and an internal VBLKSIZ blocking factor that impacts only step 410. Each of these stages would perform most optimally for certain but not necessarily identical NTHDS, NB, and VBLKSIZ. Moreover, if a particular value of NTHDS is less than the available total number of computing cores, the computing threads can either be concentrated on a few nodes or scattered over many computing nodes to further alleviate network hotspots. The scattering of the computing threads is controlled by a RANK_MULTIPLIER environmental variable.

NB and VBLKSIZ should be kept constant throughout the different stages of FIG. 4. Tile size NB may be set to a large enough number to permit efficient computation but not so large as to start to lose performance. Such a balance should be maintained in an effort to optimize the eigensolver performance on large numbers of multi-core processors. FIG. 8 illustrates an analysis of the impact of tile size on computing time in an order 64 k matrix. In the embodiment that produced the data reflected in FIG. 8, the optimal tile size was approximately 320 or at least within the range 256 to 384.

Figure 9:
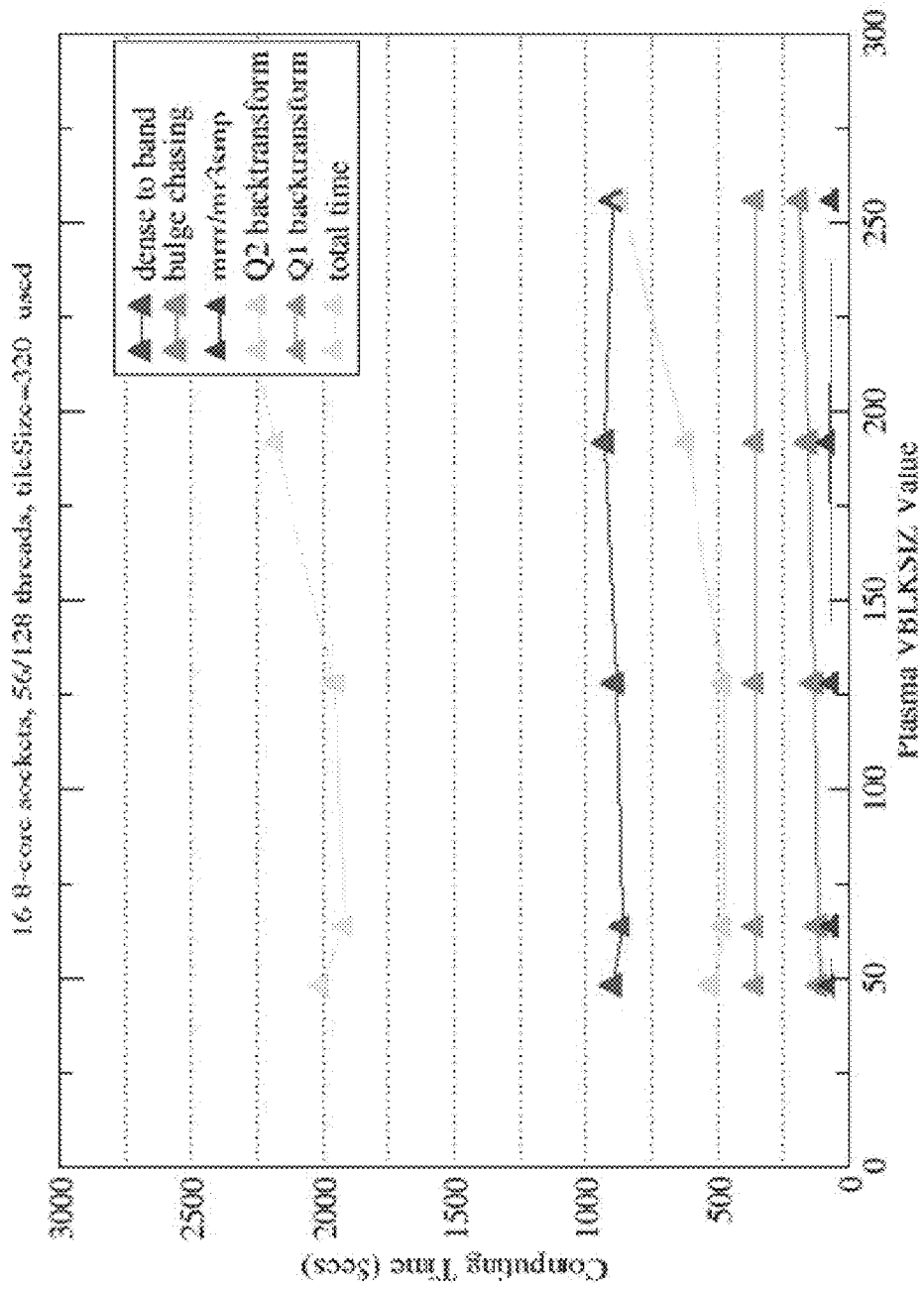
FIG. 9 illustrates the impact of variation of a block size parameter with respect to compute time.
Figure 10:
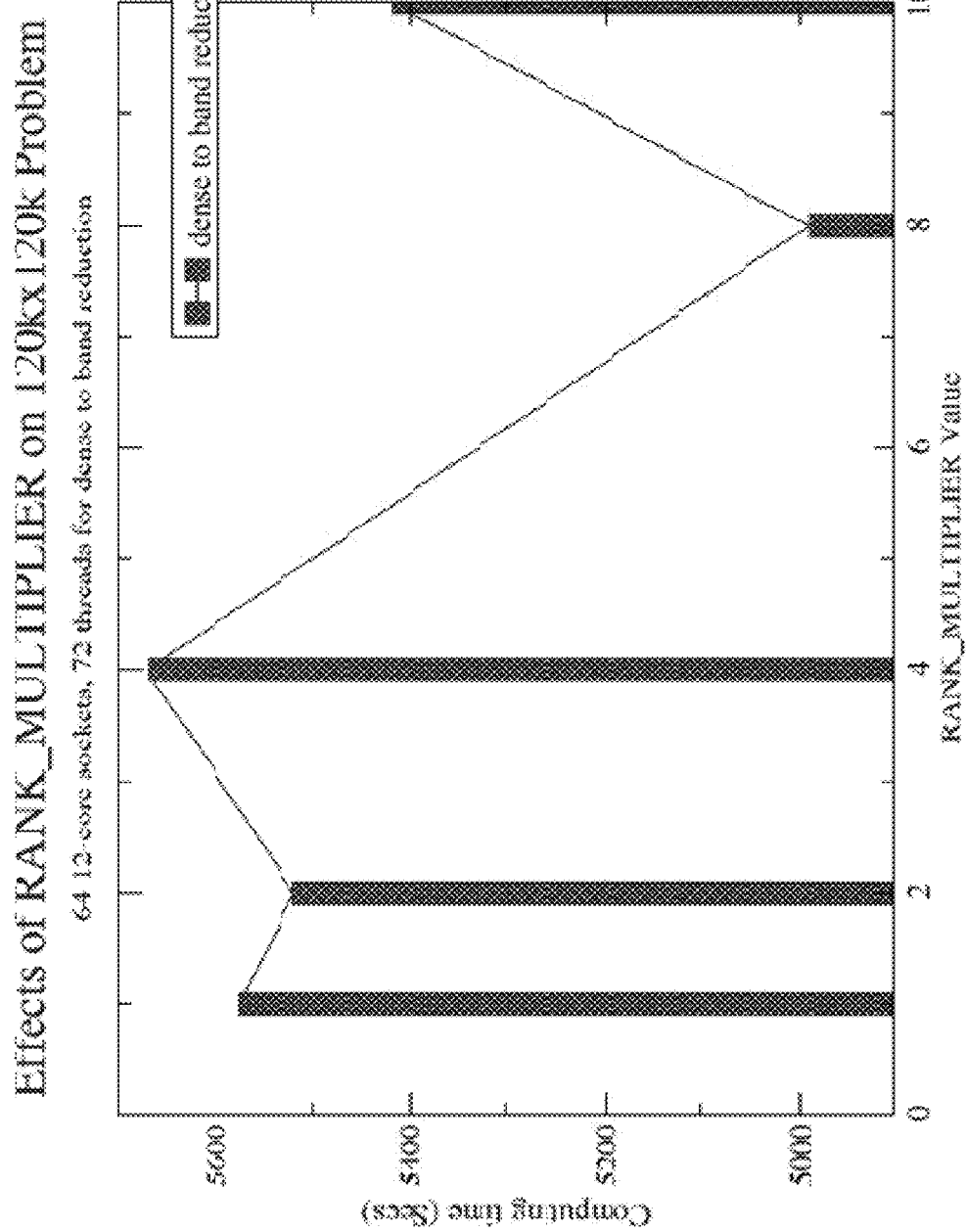
FIG. 10 illustrates the impact of variation of a rank multiplier parameter on the first process of FIG. 4.

If the runtime for step 440 of FIG. 4 is very large compared to that of steps 410 or 450, VBLKSIZ is increased until the runtime of step 440 no longer dominates that of the other steps. FIG. 9 illustrates the impact of variation of a block size parameter with respect to compute time. FIG. 9 is a graph showing the impact of variation of the VBLKSIZ parameter in the computing time of an exemplary embodiment. The value of this parameter in FIG. 9 affects run time primarily in the Q2 backtransform stage (i.e., step 440). In the embodiment tested to produce the data reflected in FIG. 9, the optimal VBLKSIZ is approximately 64 or at least within the range 48 to 128. FIG. 4 also illustrates optional optimization steps 460 and 470 of an eigensolver of the present disclosure. Step 460 is a step where the run time of a process in a set of computer processes that has a larger run time relative to another computer process in the set of computer processes is identified. Next step 470 changes a block size parameter associated with the identified computer processes in an attempt to reduce the amount of time the identified computer process takes to run when the set of computer processes is subsequently run. As such, changing a block size associated with a computer processes according to steps 460-470 of FIG. 4 may be used to identify a preferred block size that reduces the run time of a particular set of computer processes when steps 410-450 of FIG. 4 are subsequently run.

Figure 11:
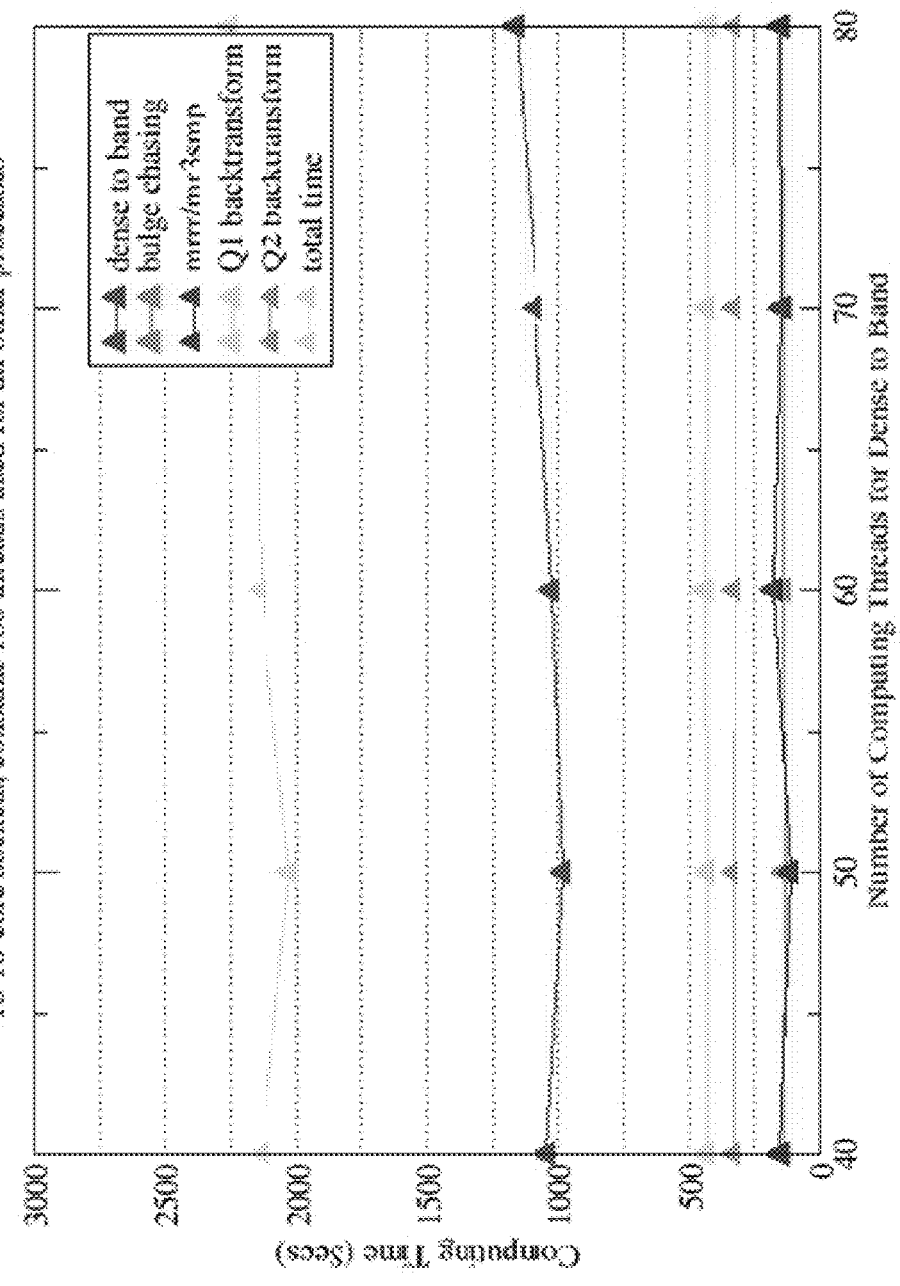
FIG. 11 is a parametric study of compute threads in the first process of FIG. 4.

In a PLASMA implementation, the PLASMA infrastructure is shut down and reinitiated with a different value of NTHDS between each of steps 410-450 as shown in FIG. 4. The number of threads is separately and respectively determined for each step as a function of the relative runtimes of the individual steps. In this way, each of steps 410-450 can use the optimal number of threads. For example, FIG. 11 is a parametric study of compute threads in the first process of FIG. 4. FIG. 11 shows a parametric study for determining the best number of threads (NTHDS) for the dense-to-band reduction (step 410) of an order 64 k matrix. In the embodiment tested to produce the data of FIG. 11, the optimal number of threads is approximately 50, or at least in the range 40 to 60.

Figure 7:
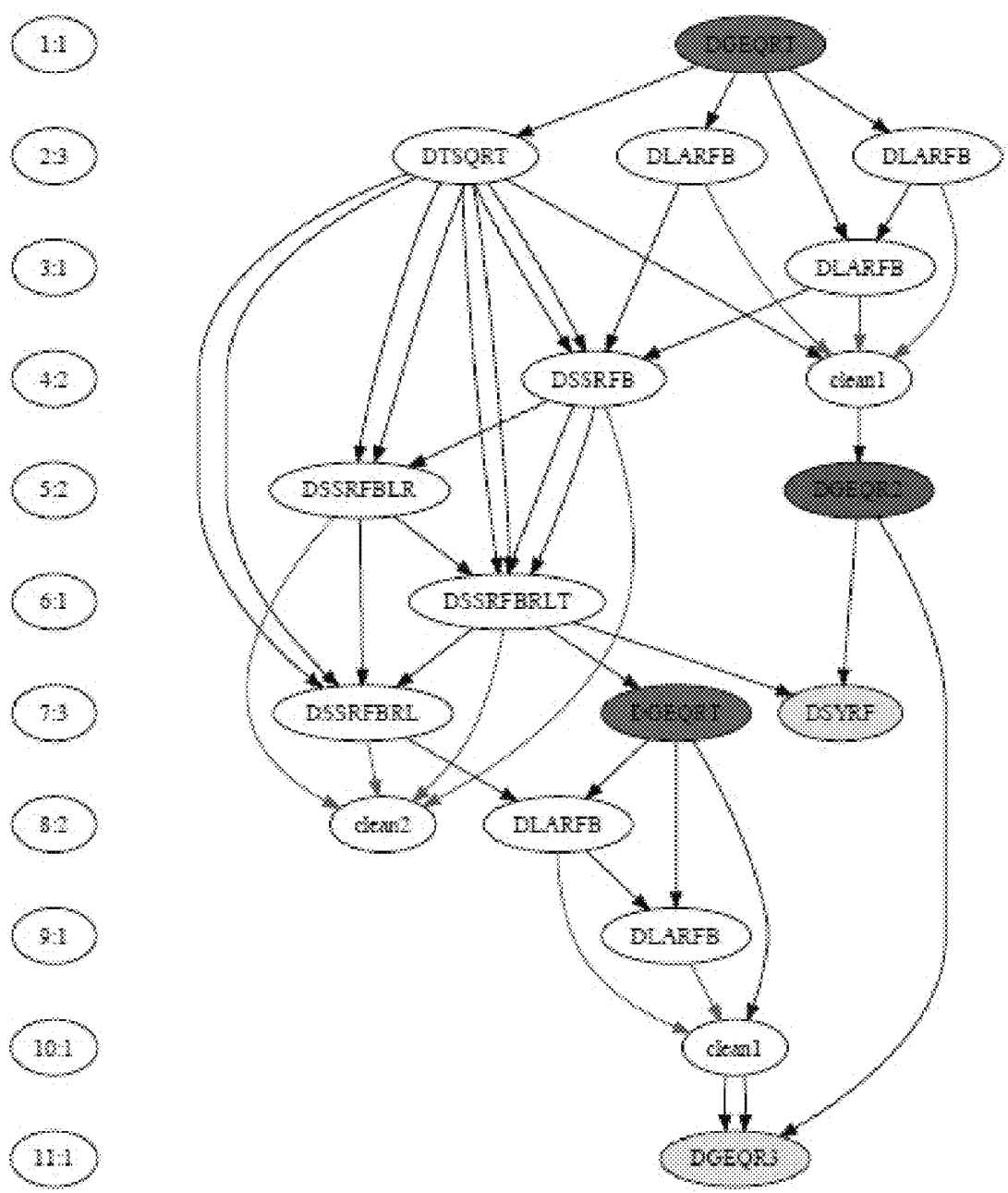
FIG. 7 is a directed acyclic graph (DAG) illustrating scheduling dependencies between tasks performing the first and second steps shown in FIG. 4 for a 3×3 matrix.

The algorithms used in FIGS. 4-5 may operate using multiple cores in an HPC system 100. A PLASMA implementation itself relies on runtime scheduling of parallel subtasks (i.e., functions such as matrix multiplications). However, some subtasks depend on others, and the relationships between the subtasks can be complex. The relationships may be expressed through a task graph, typically shown as a directed acyclic graph (DAG), which can be explored at runtime. An example of the DAG for steps 410 and 420 is shown in FIG. 7. FIG. 7 is a directed acyclic graph (DAG) illustrating scheduling dependencies between tasks performing the first and second steps shown in FIG. 4 for a 3×3 matrix.

The ovals on the left denote a step in the algorithmic sequence and the number of subtasks that can be executed in parallel in that step. Each subtask may execute on a number of cores. While all processes may be dynamically scheduled using a DAG, steps 410 and 450 may be statically scheduled for improved performance.

The present invention may be embodied in many different forms, including but not limited to, computer program logic for use with a processor such as a microprocessor, microcontroller, digital signal processor, or general purpose computer; programmable logic for use with a programmable logic device such as a Field Programmable Gate Array (FPGA) or other PLD; discrete components; integrated circuitry such as an Application Specific Integrated Circuit (ASIC); or various combinations of the foregoing.

Computer program logic implementing all or part of the functionality previously described may be embodied in various forms, including but not limited to source code, an executable, or various intermediate states that might be generated by the likes of an assembler, compiler, linker, or locator. Source code may include a series of computer program instructions implemented in any of various programming languages for use with various operating systems or operating environments. The source code may define and use various data structures and communication messages. The source code may be in a computer executable form (e.g., via an interpreter), or the source code may be converted (e.g., via a translator, assembler, or compiler) into a computer executable form. The computer program may be embodied in any tangible form as may occur in the context of a tangible storage medium such as a semiconductor memory device, a magnetic memory device, an optical memory device, a PC card, or other memory component.

Hardware logic (including programmable logic for use with a programmable logic device) implementing all or part of the functionality previously described may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

The foregoing description is not intended to be exhaustive or to limit the technology to the precise form disclosed. Many modifications and variations are possible in light of the above teaching. The described embodiments were chosen in order to best explain the principles of the technology and its practical application to enable others skilled in the art to best utilize the technology in various embodiments and with various modifications as suited to the particular use contemplated. It is intended that the scope of the technology be defined by the claims appended hereto.

What is claimed is:

1. A computerized method for computing eigenvectors and eigenvalues in a high performance computing (HPC) system having a plurality of nodes, each node including one or more processing cores for executing program threads, the nodes having non-uniform memory access, the method comprising:
   in a first computer process, reducing a square input matrix into a band matrix;
   in a second computer process, reducing the band matrix to a tridiagonal matrix;
   in a third computer process, computing eigenvectors and eigenvalues of the tridiagonal matrix using multiple relatively robust representations (MRRR);
   in a fourth computer process, transforming the computed eigenvectors of the tridiagonal matrix into eigenvectors of the band matrix using data obtained during the second computer process;
   in a fifth computer process, transforming the eigenvectors of the band matrix into eigenvectors of the input matrix using data obtained during the first computer process;
   wherein:
   the first, second, and third computer processes are each dynamically scheduled for execution on the plurality of nodes by a number of program threads, the number of threads for each scheduled process being separately and respectively identified as a function of relative runtimes of the scheduled processes, and
   the first computer process, the second computer process, the third computer process, the fourth computer process, and the fifth computer process comprise a set of computer processes; and
   adjusting the runtime of at least one computer process of the set of computer processes by modifying at least one parameter in the at least one computer process of the set of computer processes, and
   executing the set of computer processes at a subsequent time after the at least one parameter has been modified.

2. The method of claim 1, wherein the square matrix has a number of rows greater than 46,340.

3. The method of claim 1, wherein the at least one parameter modified is a tile size parameter.

4. The method of claim 3, further comprising identifying a preferred tile size associated with executing the at least one computer process of the set of computer processes, wherein the preferred tile size corresponds to a reduced runtime of the at least one computer process as compared to a runtime associated with executing the at least one computer process with a different tile size.

5. The method of claim 4, wherein the preferred tile size is selected from a plurality of different tile sizes and the each of the tile sizes of the plurality of different tile sizes corresponds to a successive band reduction (SBR) block size of an algorithm.

6. The method of claim 1, further comprising:
   setting a rank multiplier value, wherein the rank multiplier value controls a number of nodes of the plurality of nodes over which a plurality of threads are scattered when computing the eigenvectors and eigenvalues by the set of computer processes;
   computing the eigenvectors and eigenvalues according to the set of computer processes, wherein a first time computing the eigenvectors and eigenvalues is monitored;
   modifying the rank multiplier value;
   computing the eigenvectors and eigenvalues according to the set of computer processes, wherein a second time computing the eigenvectors and eigenvalues is monitored; and
   identifying that the second time computing the eigenvectors and eigenvalues is less than the first time computing the eigenvectors and eigenvalues.

7. The method of claim 1, further comprising:
   setting a first number of threads associated with the first computer process;
   computing the eigenvectors and eigenvalues according to the set of computer processes;
   monitoring a time associated with the first computer process executing the first number of threads on the one or more processors at the one or more nodes;
   setting a second number of threads associated with the first computer process;
   computing the eigenvectors and eigenvalues according to the set of computer processes, monitoring a time associated with the first computer process executing the second number of threads; and identifying that the time associated with the first computer process executing the first number of threads is less than the time associated with the first computer process executing the second number of threads.

8. The method of claim 1, wherein each of the computer processes of the set of computer processes are optimized by:
   setting a first number of threads associated with a specific computer process of the set of computer processes;
   computing the eigenvectors and eigenvalues according to the set of computer processes;
   monitoring a time associated with the specific computer process when executing the first number of threads on the one or more processors at the one or more nodes;
   setting a second number of threads associated with the specific computer process;
   computing the eigenvectors and eigenvalues according to the set of computer processes,
   monitoring a time associated with the specific computer process executing the second number of threads;
   identifying a number of threads with the lowest execution time by comparing the time associated with the specific computer process executing the first number of threads versus the time associated with the specific computer process executing the second number of threads; and
   saving the number of threads associated with the lowest execution time in memory.

9. The method of claim 1, wherein each of the computer processes in the set of computer processes is executed with a plurality of different number of threads, a number of threads associated with a lowest execution time is identified for each of the computer processes in the set of computer processes, and each of the identified number of threads for each of the set of computer processes associated with the lowest execution time is stored in memory.

10. A non-transitory computer readable storage medium having embodied thereon a program executable by a processor to perform a computerized method for computing eigenvectors and eigenvalues in a high performance computing (HPC) system having a plurality of nodes, each node including one or more processing cores for executing program threads, the nodes having non-uniform memory access, the method comprising:
   in a first computer process, reducing a square input matrix into a band matrix;
   in a second computer process, reducing the band matrix to a tridiagonal matrix;
   in a third computer process, computing eigenvectors and eigenvalues of the tridiagonal matrix using multiple relatively robust representations (MRRR);
   in a fourth computer process, transforming the computed eigenvectors of the tridiagonal matrix into eigenvectors of the band matrix using data obtained during the second computer process;
   in a fifth computer process, transforming the eigenvectors of the band matrix into eigenvectors of the input matrix using data obtained during the first computer process;
   wherein:
      the first, second, and third computer processes are each dynamically scheduled for execution on the plurality of nodes by a number of program threads, the number of threads for each scheduled process being separately and respectively identified as a function of relative runtimes of the scheduled processes, and the first computer process, the second computer process, the third computer process, the fourth computer process, and the fifth computer process comprise a set of computer processes; and
      adjusting the runtime of at least one computer process of the set of computer processes by modifying at least one parameter in the at least one computer process of the set of computer processes, and
      executing the set of computer processes at a subsequent time after the at least one parameter has been modified.

11. The non-transitory computer readable storage medium of claim 10, wherein the square matrix has a number of rows greater than 46,340.

12. The non-transitory computer readable storage medium of claim 10, wherein the at least one parameter modified is a tile size parameter.

13. The non-transitory computer readable storage medium of claim 12, the program further comprises instructions executable to identify a preferred tile size associated with executing the at least one computer process of the set of computer processes, wherein the preferred tile size corresponds to a reduced runtime of the at least one computer process as compared to a runtime associated with executing the at least one computer process with a different tile size.

14. The non-transitory computer readable storage medium of claim 13, wherein the preferred tile size is selected from a plurality of different tile sizes and each of the tile sizes of the plurality of different tile sizes corresponds to a successive band reduction (SBR) block size of an algorithm.

15. The non-transitory computer readable storage medium of claim 10, the program further comprising instructions executable to:
   set a rank multiplier value, wherein the rank multiplier value controls a number of nodes of the plurality of nodes over which a plurality of threads are scattered when computing the eigenvectors and eigenvalues by the set of computer processes;
   compute the eigenvectors and eigenvalues according to the set of computer processes, wherein a first time computing the eigenvectors and eigenvalues is monitored; modifying the rank multiplier value;
   compute the eigenvectors and eigenvalues according to the set of computer processes, wherein a second time computing the eigenvectors and eigenvalues is monitored; and
   identify that the second time computing the eigenvectors and eigenvalues is less than the first time computing the eigenvectors and eigenvalues.

16. The non-transitory computer readable storage medium of claim 10, the program further comprising instructions executable to:
   set a first number of threads associated with the first computer process;
   compute the eigenvectors and eigenvalues according to the set of computer processes;
   monitor a time associated with the first computer process executing the first number of threads on the one or more processors at the one or more nodes;
   set a second number of threads associated with the first computer process;
   compute the eigenvectors and eigenvalues according to the set of computer processes,
   monitor a time associated with the first computer process executing the second number of threads; and
   identify that the time associated with the first computer process executing the first number of threads is less than the time associated with the first computer process executing the second number of threads.

17. The non-transitory computer readable storage medium of claim 10, wherein each of the computer processes of the set of computer processes are optimized by:
  setting a first number of threads associated with a specific computer process of the set of computer processes;
  computing the eigenvectors and eigenvalues according to the set of computer processes;
  monitoring a time associated with the specific computer process when executing the first number of threads on the one or more processors at the one or more nodes;
  setting a second number of threads associated with the specific computer process;
  computing the eigenvectors and eigenvalues according to the set of computer processes;
  monitoring a time associated with the specific computer process executing the second number of threads;
  identifying a number of threads with the lowest execution time by comparing the time associated with the specific computer process executing the first number of threads versus the time associated with the specific computer process executing the second number of threads; and
  saving the number of threads associated with the lowest execution time in memory.

18. The non-transitory computer readable storage medium of claim 10, wherein each of the computer processes in the set of computer processes is executed with a plurality of different number of threads, a number of threads associated with a lowest execution time is identified for each of the computer processes in the set of computer processes, and each of the identified number of threads for each of the set of computer processes associated with the lowest execution time is stored in memory.

19. A high performance computing (HPC) system for computing eigenvectors and eigenvalues, the system comprising:
  one or more memories; and
  a plurality of nodes, each node including one or more processing cores for executing program threads, the nodes having non-uniform memory access when accessing a memory of the one or more memories, wherein:
    a first computer process reduces a square input matrix into a band matrix,
    a second computer process reduces the band matrix to a tridiagonal matrix,
    a third computer process computes eigenvectors and eigenvalues of the tridiagonal matrix using multiple relatively robust representations (MRRR),
    a fourth computer process transforms the computed eigenvectors of the tridiagonal matrix into eigenvectors of the band matrix using data obtained during the second computer process,
    a fifth computer process transforms the eigenvectors of the band matrix into eigenvectors of the input matrix using data obtained during the first computer process, wherein the first, second, and third computer processes are each dynamically scheduled for execution on the plurality of nodes by a number of program threads, the number of threads for each scheduled process being separately and respectively identified as a function of relative runtimes of the scheduled processes, and
    the first computer process, the second computer process, the third computer process, the fourth computer process, and the fifth computer process comprise a set of computer processes,
  the runtime of at least one computer process of the set of computer processes is adjusted by modifying at least one parameter in the at least one computer process of the set of computer processes, and
  the set of computer processes are executed at a subsequent time after the at least one parameter has been modified.

20. The system of claim 19, wherein the at least one parameter modified is a tile size parameter, a preferred tile size associated with executing the at least one computer process of the set of computer processes is identifies, and the preferred tile size corresponds to a reduced runtime of the at least one computer process as compared to a runtime associated with executing the at least one computer process with a different tile size.

* * * * *